United States Patent [19]

Hanson et al.

[11] Patent Number: 5,005,213
[45] Date of Patent: Apr. 2, 1991

[54] HEAD MOUNTED VIDEO DISPLAY AND REMOTE CAMERA SYSTEM

[75] Inventors: Charles M. Hanson, Richardson; Vaughn J. Koester, Dallas; Robert D. Fallstrom, Richardson, all of Tex.

[73] Assignee: Varo, Inc., Garland, Tex.

[21] Appl. No.: 507,978

[22] Filed: Apr. 11, 1990

Related U.S. Application Data

[62] Division of Ser. No. 382,243, Jul. 19, 1989, which is a division of Ser. No. 168,137, Mar. 14, 1988, which is a division of Ser. No. 883,994, Jul. 10, 1986, Pat. No. 4,786,966.

[51] Int. Cl.$^5$ .............. H04B 10/22; H04N 5/33; H04N 7/18; H04N 7/22
[52] U.S. Cl. .................. 455/617; 89/41.05; 224/181; 358/93; 358/108; 358/113
[58] Field of Search ............ 358/108, 113, 93; 89/41.05; 224/181; 455/617

[56] References Cited

U.S. PATENT DOCUMENTS

| | | | |
|---|---|---|---|
| 3,674,925 | 7/1972 | Heckman, Jr. | 358/113 |
| 3,798,796 | 3/1974 | Stauff et al. | 358/108 |
| 4,028,725 | 6/1977 | Lewis | 358/113 |
| 4,081,716 | 3/1978 | Uemura | 315/63 |
| 4,091,412 | 5/1978 | Salonimer | 358/113 |
| 4,222,880 | 9/1980 | Baur | 358/113 |
| 4,280,125 | 7/1981 | Kazan | 358/230 |
| 4,605,959 | 8/1986 | Colbaugh | 358/93 |
| 4,703,879 | 11/1987 | Kastendieck | 224/181 |
| 4,786,966 | 11/1988 | Hanson | 358/108 |
| 4,884,137 | 11/1989 | Hanson | 358/108 |

Primary Examiner—Howard W. Britton
Attorney, Agent, or Firm—Baker & Botts

[57] ABSTRACT

A video system is disclosed having a weapon-mounted video camera (12) transmitting video signals to a remotely located video display (14). The video display is mounted to the helmet (40) of a soldier (36), and includes a sight reticle (50) superimposed on the image of the target (46) so that the soldier (36) can aim the weapon (38) by moving it until the target object (46) as displayed by the video display (14) is aligned with the sight reticle (50). A low probability of transmission interception of the video signals is accomplished by using a nonvisible light carrier wavelength in free space, which wavelength is characterized by a high degree of absorption due to atmospheric water vapor.

9 Claims, 10 Drawing Sheets

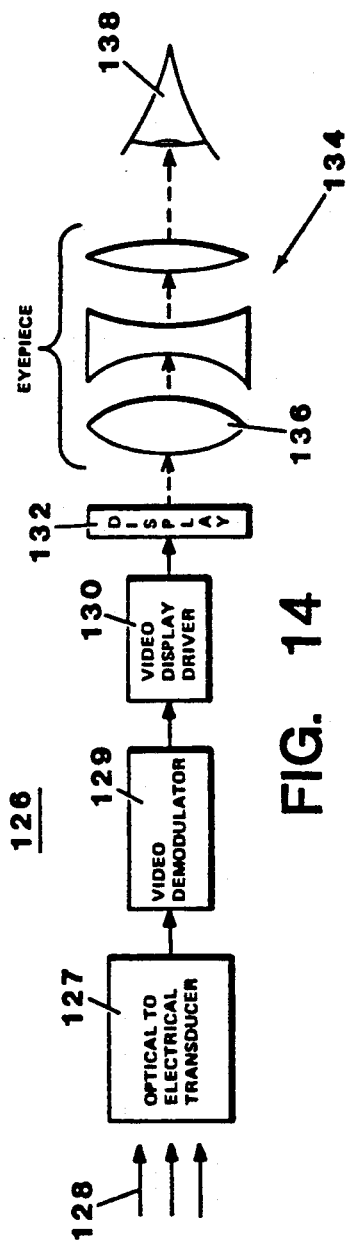
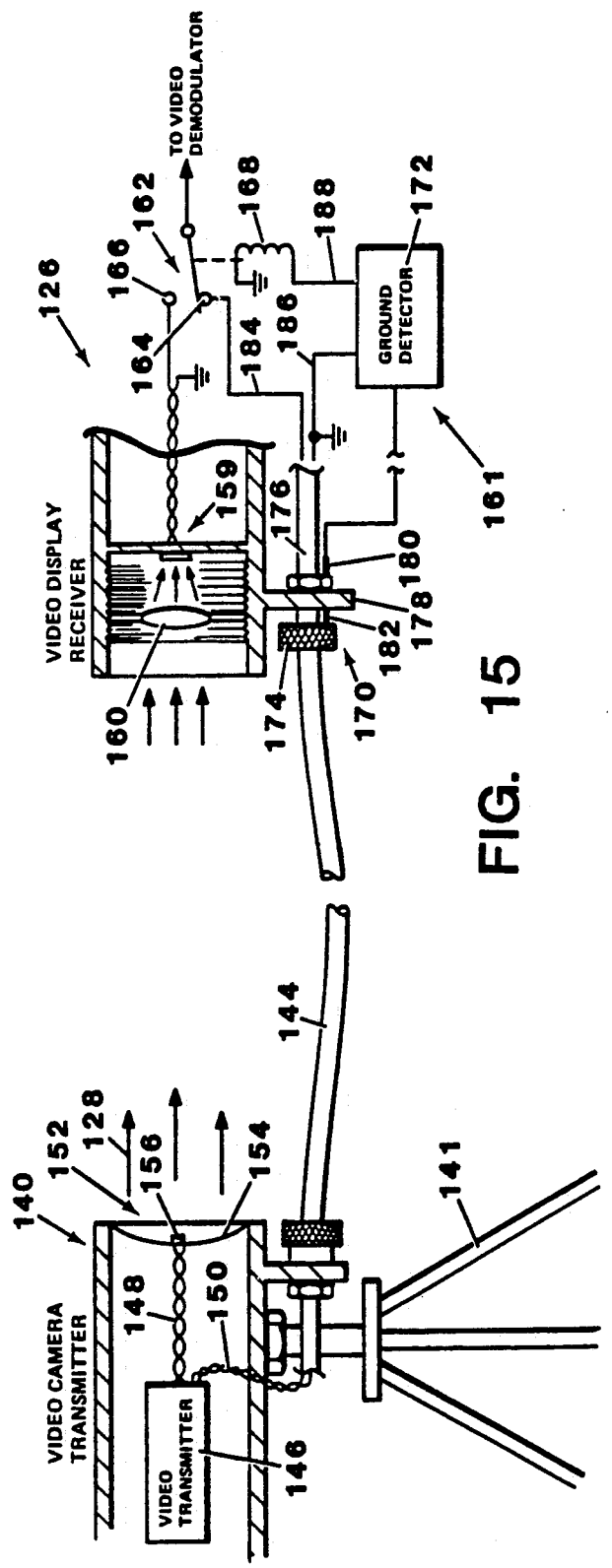
FIG. 14
FIG. 15

HEAD MOUNTED VIDEO DISPLAY AND REMOTE CAMERA SYSTEM

RELATED APPLICATIONS

This is a divisional application of Ser. No. 07/382,243, filed on July 19, 1989, by Charles M. Hanson, Vaughn J. Koester and Robert D. Fallstrom for "HEAD MOUNTED VIDEO DISPLAY AND REMOTE CAMERA SYSTEM", which is a divisional application of Ser. No. 07/168,137 filed on Mar. 14, 1988, by Charles M. Hanson, et al. and entitled "HEAD MOUNTED VIDEO DISPLAY AND REMOTE CAMERA SYSTEM", which is a divisional application of Ser. No. 06/883,994, filed July 10, 1986, by Charles M. Hanson, et al. and entitled "HEAD MOUNTED VIDEO DISPLAY AND REMOTE CAMERA SYSTEM", now U.S. Pat. No. 4,786,966, issued Nov. 22, 1988.

TECHNICAL FIELD OF THE INVENTION

The present invention relates in general to video systems, and more particularly relates to video cameras, displays and transmission apparatus for transmitting video signals under covert conditions.

BACKGROUND OF THE INVENTION

There are many situations in which it is desirable to obtain a closeup view of a situation or event from a remote location. In military applications, this is highly desirable for the safety of combat troops. Other situations occurring in a civilian setting require the same type of safety requirements.

The aiming and firing of a gun emplacement situated in the combat zone may be controlled remotely by personnel not located at the combat zone. In this situation, a video camera can be located at the gun site to obtain a closeup view of defensive positions, and at the same time transmit video signals of the combat zone scene to remotely located troops who can control the aiming of the gun. In another situation, it would be highly desirable to mount a video camera to the rifle of an infantryman, and a video display to his helmet, thereby allowing the soldier to aim the rifle without engaging the weapon in the normal aiming position. The infantryman could even remain in a hidden position and aim the gun through the use of the video display, all without exposing his body to the enemy.

With regard to the foregoing applications, it is often desirable that the video transmission from the camera to the remote display remains unavailable to the enemy so that such information cannot be used to the enemy's advantage. While elaborate encoding or encryption techniques could be employed to maintain the video transmission somewhat secret, such techniques require additional equipment, thereby adding to the weight, cost and reliability concerns to the system.

Helmet-mounted video display systems have been employed for assisting combat pilots in maneuvering aircraft and for weapons deployment. In these systems, control cables are generally connected between the helmet and the aircraft cockpit so that any movement of the pilot's head results in the corresponding movement of the weaponry. With this type of arrangement the video display and helmet are fixed to the aircraft and thus are useless for ground operations where mobility is important.

From the foregoing, it may be seen that a need has arisen for a field operated video system which provides for remotely located video camera and display equipment, as well as transmission capabilities therebetween.

SUMMARY OF THE INVENTION

In accordance with the present invention, a video system with remotely locatable equipment is disclosed which substantially eliminates or reduces the problems associated with the prior art techniques.

In accordance with a principal feature of the invention, a weapon-mounted video camera operates in conjunction with a head-mounted video display, thereby enabling military personnel to aim the weapon without assuming a line of sight position with respect to the aiming apparatus of the weapon. According to various embodiments of the invention, the video camera may be responsive to visible light, infrared radiation, thermal radiation or other particular radiation properties of the environment which enable an accentuated view of the scene or situation.

In accordance with another important feature of the invention, the video display may operate in conjunction with an image splitter disposed in the person's line of sight, thereby enabling the person to observe a superimposed scene of the object within his line of sight, as well as the object appearing on the video display.

In accordance with a correlary feature of the invention, the head-mounted video display can be operated in conjunction with night vision apparatus to provide additional viewing capabilities, as well as used in conjunction with helmet apparatus which allows the display to be easily removed out of the person's line of sight vision.

With regard to yet another feature of the invention, the video transmission between the camera and display equipment can be transmitted through a physical medium, such as a metallic conductor or a fiber optic bundle, or by free space radiation. In an embodiment of the invention, a free space radiation frequency of about 1.39 micrometers (um) permits the transmission of a video signal for only a short distance before the signal becomes significantly attenuated, due to atmospheric absorption. In this manner, the transmission of a video signal is maintained secret or has a low probability of intercept within the immediate area of activity.

Still another important feature of the invention involves the network distribution of the transmitted video signals such that an image from a single video camera can be observed by plural persons having appropriate display equipment. Also, video signal networking is disclosed for enabling a single person to selectively view the image generated by plural remotely located video cameras.

BRIEF DESCRIPTION OF THE DRAWINGS

The foregoing and other features and advantages will be apparent from the following and more particular description of the preferred embodiments of the invention, as illustrated in the accompanying drawings in which like reference characters refer to the same parts throughout the different views. Referring to the drawings:

FIG. 14 depicts in block diagram form the major components of the video display equipment;

FIG. 15 illustrates alternative switchable transmission paths between a video camera and a remotely located video display according to the invention;

DETAILED DESCRIPTION OF THE INVENTION

Figure 1:
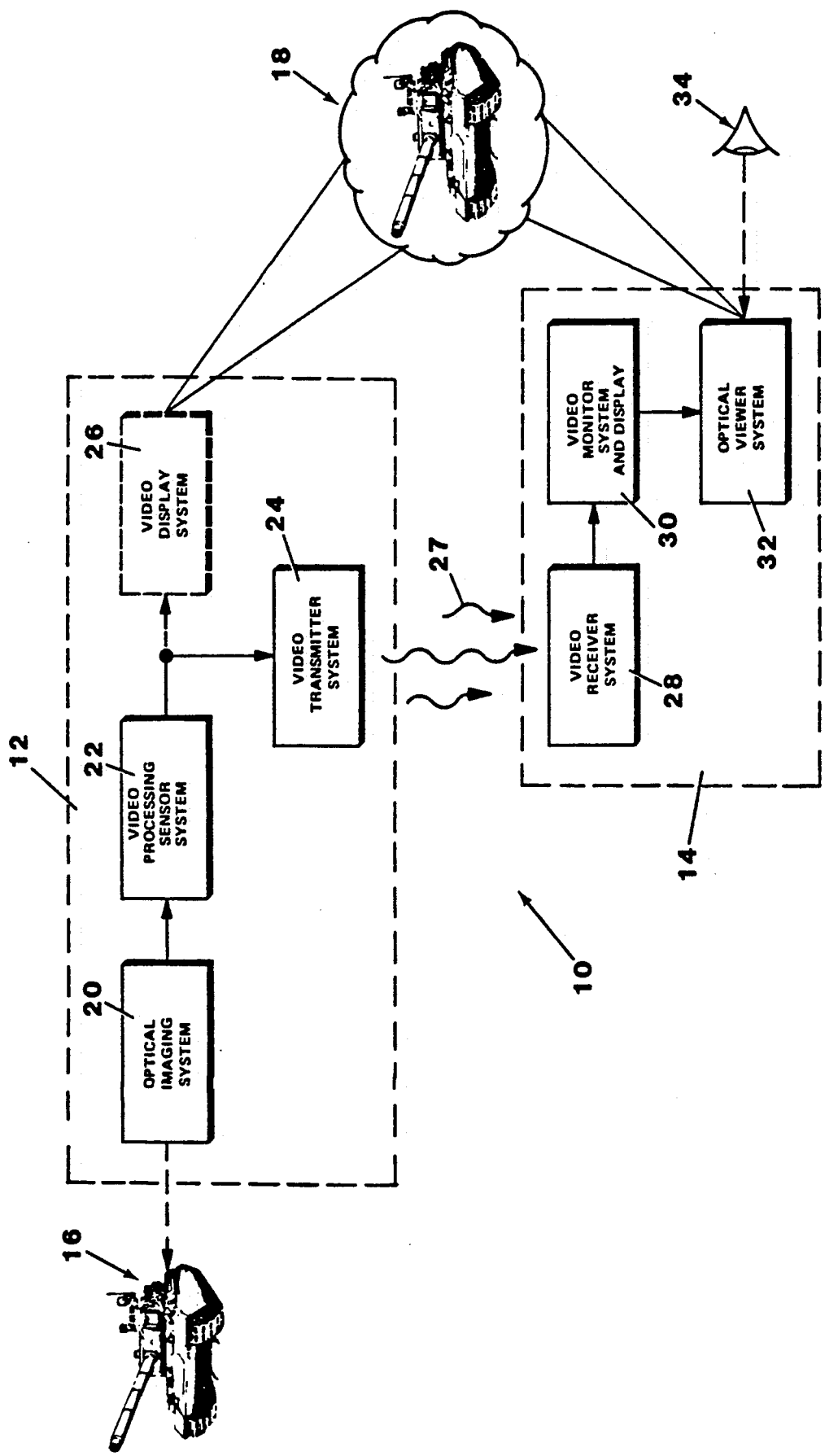
FIG. 1 is a block diagram of the video camera and display system according to the invention.

The principles and concepts of the invention are best understood by referring first to FIG. 1 of the drawings. The video system according to the invention is shown generally as reference character 10, and includes an imager shown as a video camera section 12 employed separate and apart from an imager shown as a video display 14. With regard to the example of FIG. 1, the object to be viewed is shown as an armored vehicle 16, and the image thereof provided by the video display equipment 14 is shown as reference character 18.

More particularly, the video camera 12 includes optical imaging system 20 coupled to a video processor sensor system 22 which, in turn, is coupled to a video transmitter system 24. Optionally provided integral with the camera is a video display unit 26. The optical imaging system 20 comprises a lens and filter assembly for providing a clear and accurate image of the vehicle 16 to the processing system 22. The optical imaging system 20 may be of the conventional type which provides optical correction and adjustment of objects characterized by visible light radiation. The system 20 may also be of the type which processes an infrared characterizations of the object. A resultant image of the particular type of characterization is coupled to the video processing system 22. The optical imaging system 20 may also be of the type which is responsive to thermal radiation which is characteristic of the object, or include night vision capabilities. The noted types of imaging systems are readily available, and adaptable to the video camera 12 according to the invention.

Once a visible image of the object 16 is created by the optical imaging system 20, such image is presented to the video processing system 22 for converting the optical image into a standard electrical video format. While not limited to the raster/scan type of video system, such a technique is well known in the art and can thus be easily adapted to the present invention. In essence, the video processing system 22 produces an electrical signal representation of the optical image and couples the electrical signals to the video transmitter 24. The electrical video signal is also coupled to the optional video display 26 which is integral to the camera 12. The optional video display system 26 converts the electrical signals of the object 16 back into an optical characterization thereof so as to be observable by a person. With the provision of the integral video display unit 26, a viewer can initially set up the camera 12 and use such display 26 for aligning the camera 12 with respect to a particular scene. This can be done without operating the video transmitter 24, and thus no signal is radiated in the immediate area of the camera 12.

The video transmitter system 24 provides the transmitting equipment to produce a video signal appropriate for transmitting over a desired medium. In the depiction of FIG. 1, the transmitted signal 27 is shown transmitted in a free-space medium. That is, the video signal is transmitted through the atmosphere without a physical or hardware connection between the camera 12 and the remote video display 14. The video transmitter system 24 can be of the type adapted for modulating the video signal onto an electrical carrier of a desired frequency, or onto a carrier in a frequency band which is in the visible light range, or above such range. In those situations where the camera 12 and video display 14 are mounted adjacently on a combat helmet, the video transmitter system 24 may be dispensed with entirely, whereupon the electrical video signal is coupled directly to the video display 14 by a coaxial cable, or other suitable conductor. In other applications where the video camera 12 is located in the immediate area of the video display 14, and where the transmission of the video signal is to remain absolutely secure, the transmission medium may include a fiber optic bundle. In this event, the video transmitter system 24 would include an electrical to optical converter.

The remotely located video display 14 is provided with a video receiver system 28 for receiving the video signal transmitted by the camera 12. The video receiver system 28 is coupled to a video monitor system and display 30 which regenerates an optical image of the object 16 from the electrical characterization of such image. An optical viewer 32 comprises a lens arrangement for providing optical correction, magnification or other adjustment for presentment of the image to the viewer 34. As noted in FIG. 1, the image 18 can be observed either from the remotely located display 14 or the optional integral video display 26, if provided.

Figure 2:
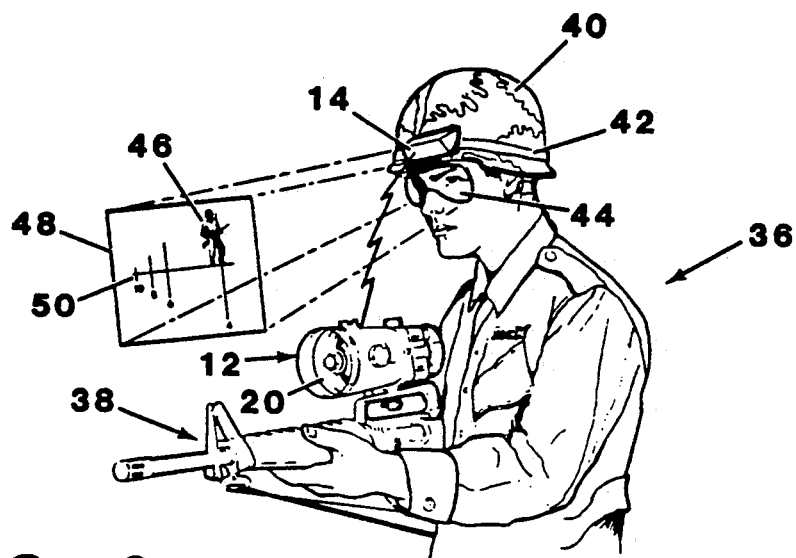
FIG. 2 illustrates a typical application of a rifle-mounted video camera operating with a free space transmission of video signals to a helmet-mounted video display.

Referring now to FIG. 2, there is shown an application of the invention which is envisioned to be advantageous for combat personnel. A soldier 36 is equipped with a rifle 38 to which a video camera 12 is mounted. The video camera 12 is fastened to the rear portion of the rifle barrel and above the sight mechanism so as to provide an unobscured aim of the rifle, should the soldier use the weapon in a conventional manner. The video camera 12 is shown equipped with an infrared or thermal detector, comprising the optical imaging system 20. With this arrangement, objects can be identified by the nature and extent of the heat emitted, and recognized by the solder 36 in the video display 14 by the solder 36.

In accordance with conventional combat protection gear, the soldier 36 is provided with a helmet 40. Mounted to the helmet 40 is the video display equipment 14 which receives free space video transmissions from the camera 12 to thereby provide the solder 36 with an infrared (IR) generated image without having to continuously look through a rifle-mounted IR equipment. The video display 14 is shown fastened to the helmet by a strap 42, which strap is fixed to the helmet by rivets (not shown) or other suitable means. The video display 14 is also depicted receiving free-space transmissions of the camera-generated video image. The solder 36 is outfitted with a screen 44, goggles or other similar eyewear on which the image of the object can be holographically presented. The image 46 is shown removed and disposed in a frame 48 in the manner presented by the display 14 to the soldier 36. The image 46 can also be superimposed on a reticle 50 which provides the soldier 36 information such as range, size, elevation, etc. Holographic projection systems are well-known in the art and are readily adaptable for use in the noted example.

The application of the invention shown in FIG. 2 provides many advantages to the combat solder. For example, a gunner in an armored vehicle equipped with the camera 12 and the helmet-mounted display 14 of the invention can reload or carry on other operations while watching a target through the head-mounted display. As an additional advantage, the invention may significantly reduce the time to thus aim and fire the weapon. In the case of a foot soldier equipped with a camera-mounted rifle 38 and a helmet-mounted video display 14, the soldier can aim the weapon from a full defilade position and shoot from the hip. With the provision of the head-mounted video display 14, a solder can also wear a gas mask without impairing or making more difficult the aiming of the weapon 38. This is a result of a soldier not having to rest the gun on his shoulder for aiming through the conventional sights. Rather, he need only concentrate on the head-mounted video display 14. Not only does the invention eliminate eye and neck strain should a prolonged conventional aiming position be required, but it also eliminates the motion or agitation of the rifle which has the effect of losing aim on the target. This is particularly important, for example, in an armored vehicle where a conventional control panel-mounted video display moves to the same extent as the vehicle according to the roughness of the terrain. Hence, it becomes very difficult for the observer to concentrate on the wiggling video image. In accordance with an important feature of the invention, the head-mounted feature of the video display system secures the display, and thus the video image of the object with respect to the observer's eyes.

Figure 3:
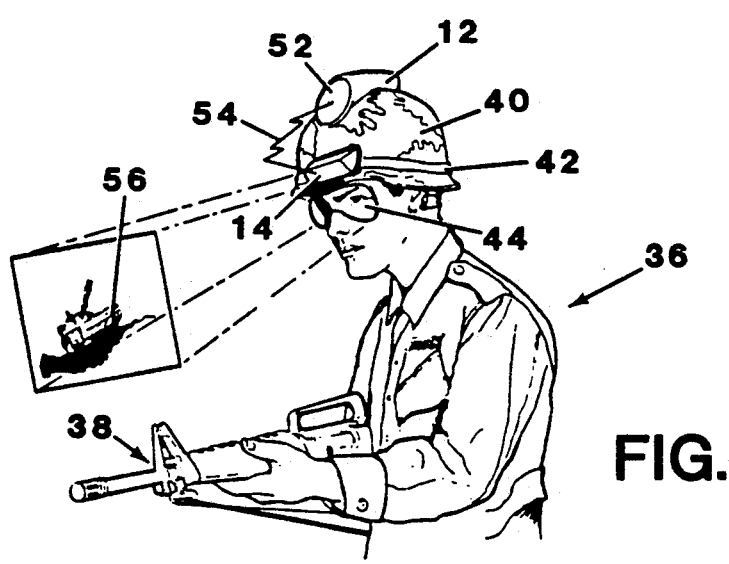
FIG. 3 illustrates an alternative embodiment of the invention in which both the video camera and display are helmet mounted.

FIG. 3 illustrates another embodiment of the invention wherein both the video camera 12 and the display 14 are helmet-mounted. The video camera 12 shown in FIG. 3 is provided with a thermal or infrared detector 52. Again, a video image of the thermal representation of the object is transmitted by free space 54 to the video display 14. The video camera 12 can be mounted to the helmet 40 by any suitable securing means. The image 56 displayed to the soldier 36 is shown as a motorized gun emplacement, thereby yielding an indication of the thermal characteristics of the motor and the personnel around the target.

Figure 4:
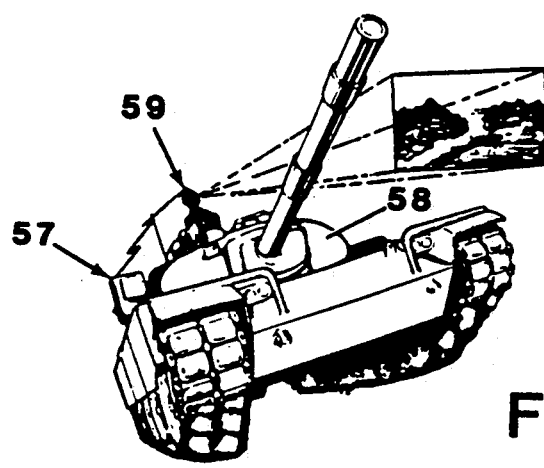
FIG. 4 illustrates a vehicle guidance system including an outside mounted video camera transmitting a video image to the driver concealed within the vehicle.

FIG. 4 illustrates an additional application of the invention. A video camera 57 is mounted exterior to an armored vehicle 58 for providing a view of the terrain in front of the vehicle 58. The video image of the object is again transmitted by free space techniques to a receiver 59. The receiver 59 may be coupled by a coax or fiber optic line to a video display (not shown) mounted to the helmet of the tank driver. The driver (not shown) can then assume other duties within the vehicle without having to constantly look through a periscope, peephole or at a dash-mounted CRT display.

Figure 5:
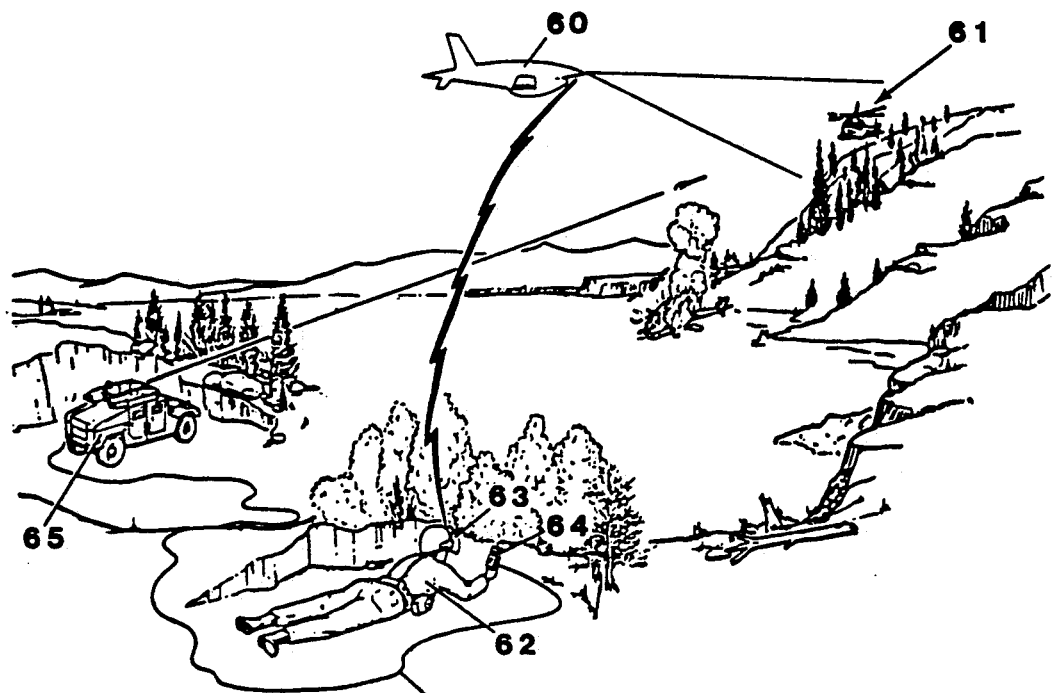
FIG. 5 illustrates an application of the invention utilizing an air-to-ground free space transmission of an image, and a ground-to-ground physical transmission medium.

FIG. 5 depicts another application of the invention. An aircraft 60 can fly into a position of surveillance of a target 61 and relay an image thereof to ground personnel 62. Based upon the image displayed on the helmet apparatus 63 of the ground personnel 62, appropriate gun control parameters can be keyed into a remote fire control unit 64 to aim the vehicle mounted weapon 65 at the target 61. The remote control 64 is connected to the vehicle-mounted weapon 65 by a secure fiber optic fire control link 66.

Figure 6:
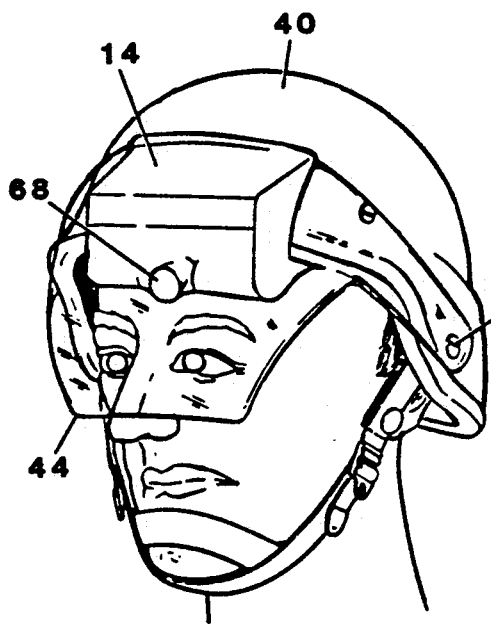
FIG. 6 is an isometric view of one embodiment of a helmet-mounted image display system employing holographic display techniques.
Figure 7:
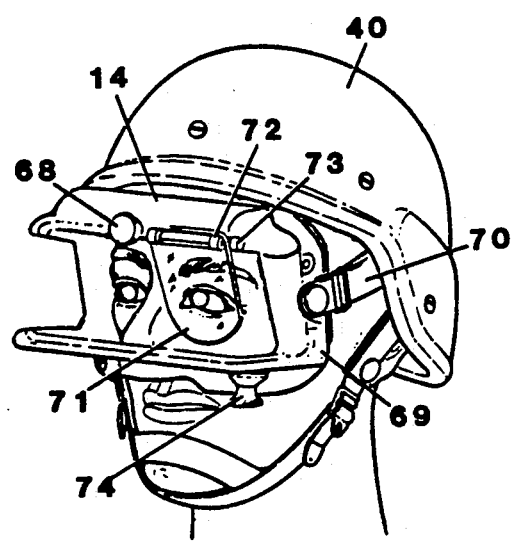
FIG. 7 is an isometric view of a headgear-mounted image display system employing a beam splitter which can swing out of the user's line of sight.

FIGS. 6 and 7 illustrate other helmet-mounted video display arrangements where the corresponding parts thereof are identified by the same reference characters as shown in FIGS. 2 and 3. In this arrangement, the display screen 44 is formed integral with the video display 14, and the combination is pivotally mounted to the helmet 40 by a screw 67. The display screen 44 and the display unit 14 can be rotated upwardly out of the line of sight of the soldier. Display screen 44 is transparent so the soldier may see through the screen when he is not focussing on images on the screen. The display unit 14 houses the projection and display optics as well as the video link receiver and power supply. A video receiver fish eye objective lens and detector assembly 68 receive the free space optical radiation of an image transmitted from a remote location. The remote image transmitter may be gun, vehicle- or aircraft-mounted, or mounted to a tripod.

FIG. 7 illustrates a headgear 69 equipped with the video display 14. The headgear 69 is mounted to the user's head by a strap 70. The helmet 40 fits over the headgear strap 70 and provides conventional protection. In this embodiment, a beamsplitter video screen 71 provides the medium upon which the image is protected by the display unit 14. The beamsplitter screen 71 is hinged 72 so that it can be removed from the soldier's line of sight. A focus and lateral adjustment 73 provides three axis adjustments to properly focus the projected image in front of the user's eye. An off-on switch 74 is manually operated to render the electrical circuits of the display unit 14 operational.

Figure 8:
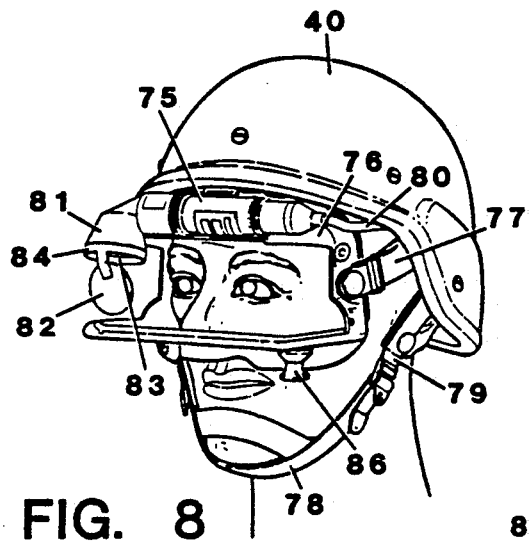
FIG. 8 illustrates helmet-mounted video display apparatus for allowing split image viewing of the video image as well as the object in the person's line of sight.

FIGS. 8-11 illustrate various other embodiments of the invention secured to the head of a soldier. In FIG. 8 a video receiver 75 is mounted to a face frame 76 which is fastened to the person's head by an adjustable headdress strap 77. The face frame 76 is molded in the general shape of the facial features surrounding a person's eyes and nose. A helmet 40 may be worn over the display headdress, and thus the cranial protection of the person need not be compromised. The helmet 40 is secured to the head of a person by a combined chin strap 78 and a depending side strap 79.

The video receiver 75 is secured to the face frame 76 and is thus made integral therewith so that the video receiver 75 ideally follows the motions of the observer's head. The video receiver 75 is connected by a cable 80 to an electrical or optical antenna for receiving transmissions from a remotely located camera. Provided with the video receiver 75 is an image viewer or screen 81, such as a vacuum fluorescent display, a cathode ray tube, an electroluminescent display, or a liquid crystal display. All such types of displays can be obtained in miniature form suitable for use as described herein. One type of miniature display particularly suitable for use is the vacuum fluorescent display described in U.S. Pat. No. 4,081,716, and may be obtainable from ISE Electronic's Corp., ISE, Japan. This display is approximately 7 mm by 10 mm, operates on only 15 volts and thus is ideally suited both as to size and weight for use with the invention.

The optical viewer 81 is optically coupled to the receiver 75 so as to present an image to the person corrected with respect to focus, magnification and other appropriate parameters. As noted in FIG. 8, the optical viewer 81 redirects the image from a horizontally directed image plane to a vertical image plane adjacent one of the observer's eyes. A partially reflecting mirror 82 is mounted to the optical viewer 81 at an angle of about 45 degrees, and is disposed directly under the exit lens 83 of the optical viewer 81. The redirected image of the object is thus reflected from the mirror 82 and presented for viewing to the observer.

Because the mirror 82 is only partially reflecting, the person can also see objects that are disposed on the opposite side of the mirror 82. Thus, the person has available for viewing with one eye superimposed objects, namely the video image from the display 81, as well as objects in the line of sight vision of the observer. The reflecting mirror 82 is mounted within a frame which is pivotally mounted 84 to the optical display 81. The person can thus swing the reflecting mirror 82 upwardly and out of the line of sight vision of the eye with which it is aligned. Hence, the person can observe the surroundings in the event a video display is not desired. Additionally, a switch 86 is mounted to the face frame 76 for providing electrical power control of the video receiver 75. The switch 86 is wired to the video receiver 75 to provide on-off operation. The switch 86 is mounted at the foremost part of the face frame 76 so as to be readily accessible for operation by the wearer of the headdress.

Figure 9:
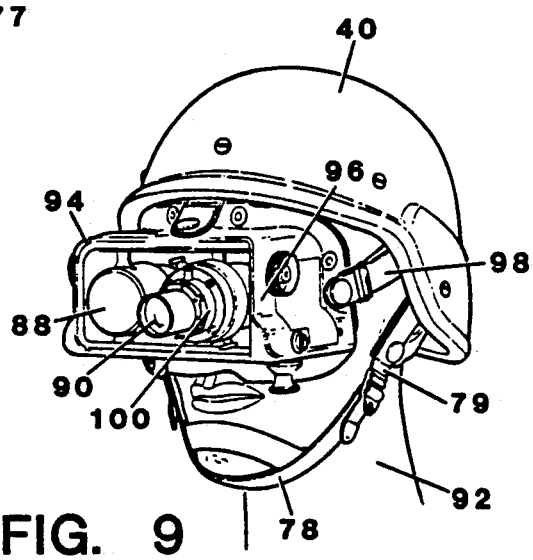
FIG. 9 illustrates head gear incorporating both a video display and night vision equipment.

FIG. 9 illustrates an adaptation of a video display 88 with night vision equipment 90 to provide the viewer 92 with alternative image characterizations of an object. With this arrangement, the video display 88 and the night vision equipment 90 are disposed in the line of sight division of the respective left and right eye of the observer 92. The face frame 94 of this embodiment fits flush against the face of the wearer 92, and includes an outwardly extending shell 96 which houses the video display 88 and night vision equipment 90. The video display 88 and night vision equipment 90 are secured within the face frame shell 96 and are thereby protected. The face frame 94 is secured to the head of the wearer 92 by an adjustable strap 98. With this arrangement, the vision equipment 88 and 90 can only be removed by removing the face frame 94 from the head of the wearer 92.

The night vision equipment 90 includes a conventional image intensifier tube 100 which presents an electronic light amplified presentation of the object, with only very small amounts of light illuminating the object. In accordance with the conventional night vision equipment, starlight is sufficient to illuminate a distant object for easy viewing on the backside of the image intensifier tube 100. The video display 88 has an inherent narrow field of vision. Thus, objects peripheral to the line of sight vision, as viewed through the video system, are generally not displayed. This creates a disorienting affect when it is necessary for a person to freely move about. The tendency is, for the wearer who depends entirely on the video system, to constantly look from side to side to effectively increase the field of view. When the night vision equipment is provided which has a much larger field of view, the wearer 92 can look through both the video display 88 and the night vision equipment 90 and gain advantage of both types of optical equipment. In other words, when a viewer is equipped with the optical apparatus shown in FIG. 9, the night vision equipment 90 can be used to view the general environment disposed in front of the person 92, while the video display 88 permits the wearer 92 to then focus on objects which would not otherwise be in the line of sight vision.

Figure 10:
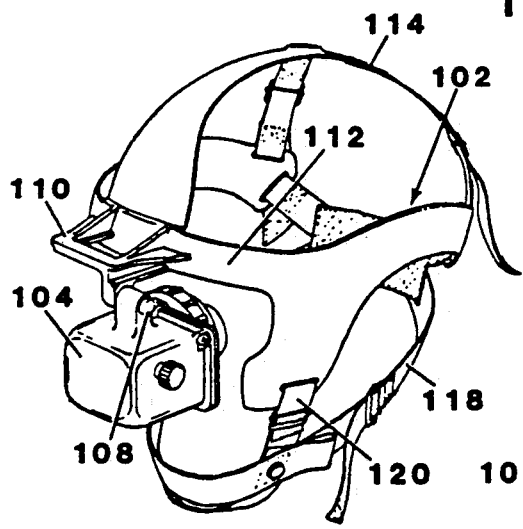
FIG. 10 is an oblique view of a video display, hingeably mounted to a headgear.

A headgear-mounted video display is shown in FIG. 10. A helmet may or may not be needed with this alternative. The headgear 102 provides a headdress to which a flat panel video monitor or display 104 is hingeably mounted.

Figure 11:
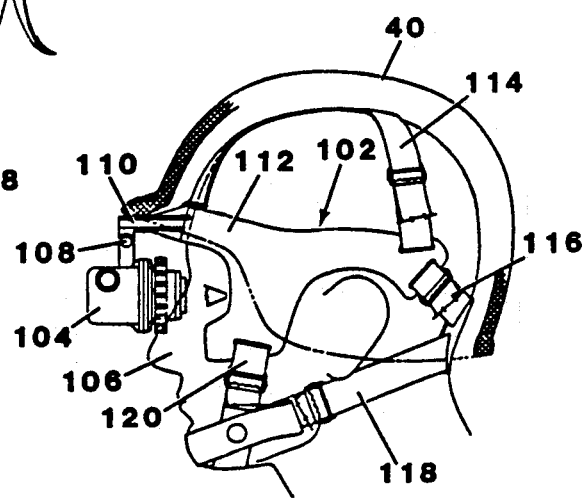
FIG. 11 is a side view of the headgear mounted video display of FIG. 10.

In FIG. 11 a helmet 40 is shown worn over the video display headgear 102. The headgear 102 is shown for mounting the video display 104 adjacent the eyes of a wearer 106. The details of the headgear 102 are disclosed in more detail in U.S. Pat. No. 4,703,879 and entitled Night Vision Goggle Headgear. The video display 104 is mounted by a pivotal connection 108 to an overhanging frame structure 110 so that the video display 104 is cantilevered in front of the viewer's eye. The frame structure 110 is formed integral with a headband 112 of the headgear 102. Straps 114, 116, 118 and 120 secure the headgear 102 to the wearer's head. With this arrangement, a helmet 40 can be easily worn, if desired, over the headgear 102 and thus facilitate full vision capability as well as protection.

Figure 12:
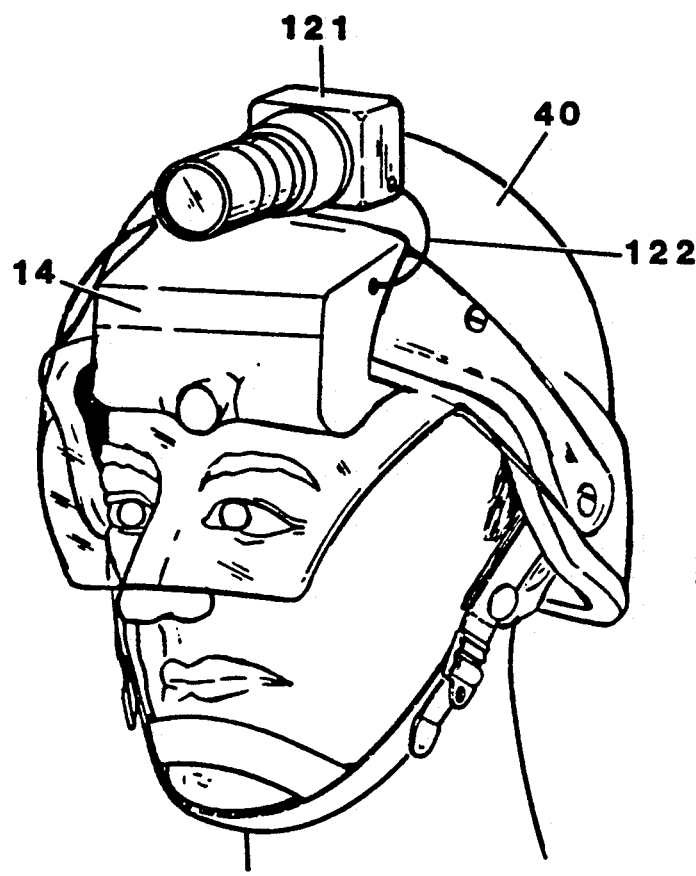
FIG. 12 illustrates night vision equipment mounted to a helmet, and coupled by a physical transmission medium to a display.

A video display system is shown in FIG. 12 receiving an image from helmet-mounted night vision equipment 121. The night vision equipment 121 is fixed to the helmet 40 so that whenever the user turns his head, the corresponding view is displayed by the display unit 14. The night vision equipment provides an image of the object through a physical conductor 122 to the display unit 14. The physical conductor 122 may comprise a coaxial cable or fiber optic cable. This embodiment is tailored to the exclusive use of the display in low light conditions. However, the night vision equipment can be replaced with a thermal or infrared sensitive unit.

Figure 13:
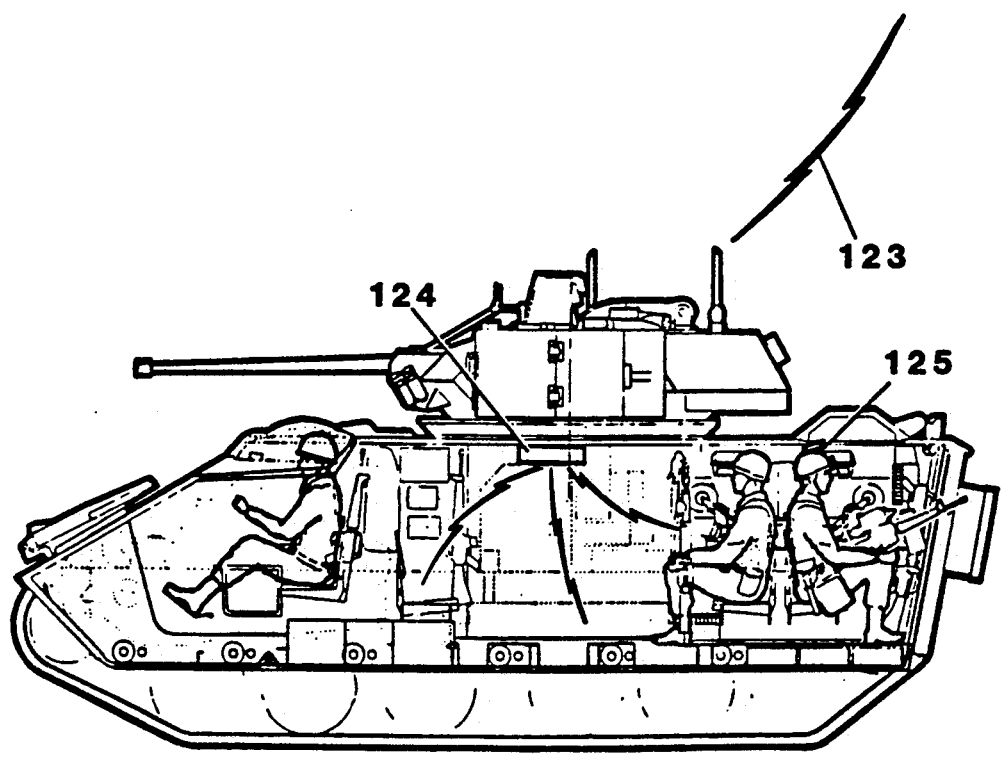
FIG. 13 is a cross-sectional view of an armored military vehicle having omnidirectional image transmitting capabilities within the vehicle.

FIG. 13 is illustrative of yet another application of the invention, wherein an armored vehicle receives video transmissions 123 from a remotely located imager (not shown). A receiver unit 124 mounted within the vehicle retransmitts the video image omnidirectionally. In this manner, each person within the vehicle who is equipped with a head mounted display 125 can observe the image. There is a low probability of intercept of the video signals retransmitted within the vehicle due to the enclosed nature thereof.

FIG. 14 illustrates a detailed block diagram of a video display receiver system 126 of the invention. In the exemplary receiver system 126, an optical to electrical transducer 127 receives free space radiation 128 from a video transmitter (not shown) encoded with information relating to the object. The radiation 128 may be characterized by a wavelength either in the visible light range, or shorter. The optical to electrical transducer 127 may comprise, for example, a material disposed in the path of the radiation 128 and responsive to the particular wavelength of the radiation 128. The material thus produces an electrical output representative of the modulated free space video signal. A video demodulator 129 is coupled to the transducer 127 for demodulating a video signal into constituent electrical components suitable for driving a video display. A video display driver 130 receives the coded signal from the video demodulator 129 and drives a display 132 so that an image of the object is displayed thereon. The video display driver 130 is of conventional design and adapted to drive a raster/scan type of display, if such type of display is employed. If a matrix type of display is used, the driver 130 would be adapted for individually addressing each element of the matrix with a signal having characteristics of the brightness with which that element should be illuminated. Preferably, the display 132 is of the miniature, lightweight, low power type suitable for mounting to the helmet or headgear of a wearer. A vacuum flourescent display of the type disclosed in the noted patent has these qualities.

An eyepiece assembly 134 is disposed in the output optical path of the display 132 and comprises plural lenses, such as 136, for interfacing the image on the display 132 to the human eye 138. The eyepiece assembly 134 may include the various combinations of lens types to suit individual needs. In addition, the eyepiece assembly 134 may be used in conjunction with the partial reflecting mirror 82 of FIG. 8.

With reference now to FIG. 15, there are shown the details of an arrangement for coupling a video camera transmitter 140 to the video display receiver 126. The imager or camera 140 is shown mounted on a tripod 141. As described above, the video camera transmitter 140 can be located remotely from the head-mounted video display receiver 126, such as on a weapon, a vehicle or also on a tripod. These suggested mounting locations are only exemplary, and are not to be interpreted as limiting the applicability of the invention to particular situations. The arrangement of FIG. 15 provides dual modes of video transmission between the video camera transmitter 140 and the video display receiver 126. In one mode of operation, the video information is transmitted in a free space medium 128 from the transmitter 140 to the receiver 126. In another mode of operation, the modulated video signal is transmitted from the transmitter 140 to the receiver 126 by a physical medium, such as a fiber optic or a coaxial cable 144. The physical medium 144 can be advantageously used in those situations where the utmost security of the video signal is desired, or where the atmospheric conditions do not permit an acceptable medium for a free space transmission.

The video camera transmitter 140 includes a video transmitter 146 for transmitting a modulated video signal of the image on a pair of output conductors 148 and 150. Transmitter line 148 drives an electrical to free space transducer 152 for transmitting the free space video signal 128. Transmitter conductor 150 drives the physical conductor 144 with appropriate video signals. Physical conductor 144 can be of the coaxial type, in which event the signals on video transmission line 150 are electrical in nature. However, the physical conductor 144 can also be a fiber optic bundle, wherein the signals in transmission line 150 would be converted to modulated light signals.

The electrical to light transducer 152 of the video camera transmitter 140 includes a reflector 154 for providing a desired directional radiation characteristic. When it is desired to transmit a highly directional modulated video signal in free space 128, the reflector 154 can be shaped in a parabolic form to focus the transmitted video signal in a beam collimated in a desired direction. In the alternative, the video signal may be transmitted omnidirectionally, wherein any video display receiver in the area would be capable of receiving the video signal. The electrical transducer 152 further includes a light transmitting element 156 which converts the video signal on transmission conductor 148 into modulated light signals. The nature of the materials comprising the element 156 determines primarily the wavelength of the transmitted energy in free space 128. Materials are presently available to provide free space transmissions from the short ultraviolet spectrum to the far infrared spectrum.

The video display receiver 126 is provided with an optical to electrical transducer 159 for converting the free space 128 transmission of the video signal into corresponding electrical representations. Further details of the transmitter transducer 156 and the receiver transducer 159 will be disclosed below. A focusing lens 160 is disposed in the path of the free space video signal 128 for focusing the light radiation on the electrical transducer 159. The lens 160 is preferably constructed of a material which has a low degree of attenuation to the particular wavelength of the free space transmission. Of course, the material with which the optical to electrical transducer 159 is constructed is also highly responsive to the particular frequency or wavelength of the free space radiation.

The video display receiver 126 is provided with a feature in which the image chosen to be displayed on the video display 132 is automatically switchable from the free space transmission medium 128 to the physical medium 144. An automatic selection means 160 is provided for automatically selecting the physical medium 144 when the cable is connected to the video display receiver 126, and for selecting the free space transmission 128 when the physical medium 144 is disconnected. To that end, the video display receiver 126 includes a switch 162 switchable between a first position 164 and a second position 166 in response to the electrical energization of an associated relay coil 168. When the switch 162 is in the first position 164, the video signal transmitted on the physical medium 144 is coupled to the video demodulator 129. On the other hand, when the switch 162 is switched to the second position 166, the free space transmission 128 of the video signal is coupled to the video demodulator 129.

The automatic switching mechanism 160 further includes a physical medium connection arrangement 170 for ohmically connecting the physical medium 144 to the video display receiver 126. Also included is a ground detector 172 coupled between the ohmic connection arrangement 170 and the switching relay 168. For purposes of illustration, when the physical medium 144 is a coaxial cable carrying electrical video signals, such cable is commonly terminated with a BNC type metallic connector 174. The BNC connection 174 is attachable to a corresponding coaxial cable 176 fastened to a frame part 178 of the video display receiver 126. Also mounted to the frame 178 is a spring-loaded probe assembly 180 insulated from the frame 178. Disposed on the other side of the frame 178 is the spring-loaded end 182 which is conductive and engagable with the metallic connector 174. Thus, when the physical medium 144 is appropriately attached to the video display receiver 126, the metallic connector 174 makes electrical contact with the spring-loaded end 182.

In accordance with conventional connections, the metallic connector 174 is connected internally to a shield or ground conductor of the cables 144 and 176. As noted in FIG. 15, the coaxial cable 176 includes a signal conductor 184 for carrying the video signals, and a shield conductor 186 for providing electromagnetic shielding to the signal conductor 184. When the physical conductor 144 is connected to the coaxial cable 176 by connector 174, the potential of the grounded shield 186 is transferred through the connector 174 to the probe 180, and then coupled to the ground detector 172. When a ground potential appears on the conductor 180, the ground detector 172 detects this as a connection of the physical medium 144 to the video receiver 122, whereupon relay 168 is operated. The ground detector 172 can be, for example a logic NOR gate for providing a logic output high in response to input logic low levels representative of the ground potential on the shield conductor 186 and the conductor 184.

The relay contacts 162 are shown in FIG. 15 in the operated position, illustrating that when the physical medium 144 is connected to the video display receiver 126, the signal carried on conductor 184 is coupled to the video demodulator 129. When the connector 174 of the physical medium 144 is disconnected from the video display receiver 126, the ground potential will be removed from conductor 180, whereupon the output 188 of the ground detector 172 will be driven to a logic low, thereby releasing relay 168. The switch 162 will then make contact with the second contact 166 and thereby automatically couple the free space transmission 128 of the video signal to the video demodulator 129. Those skilled in the art may devise other physical conductor switching arrangements 170 or detectors 160 which will operate with equal effectiveness.

In accordance with another important feature of the invention, the wavelength for transmitting the video signal is selected so as to provide transmissions having a low probability of intercept, thereby preventing the reception of the signals by the enemy or other unauthorized persons. One technique for accomplishing the transmission having a low probability of intercept is to assure that the transmission of the video signal is restricted to a narrowly defined area. When the transmission medium for the video signal is a physical conductor, the reception of the signal is limited only to the receiver connected therewith. The secrecy problem is exacerbated when it is desired to transmit the video information through the atmosphere. With the free space transmission of signals, the area of reception is less defined, and is determined by many atmospheric conditions which are susceptible to change at unpredictable times.

Figure 16:
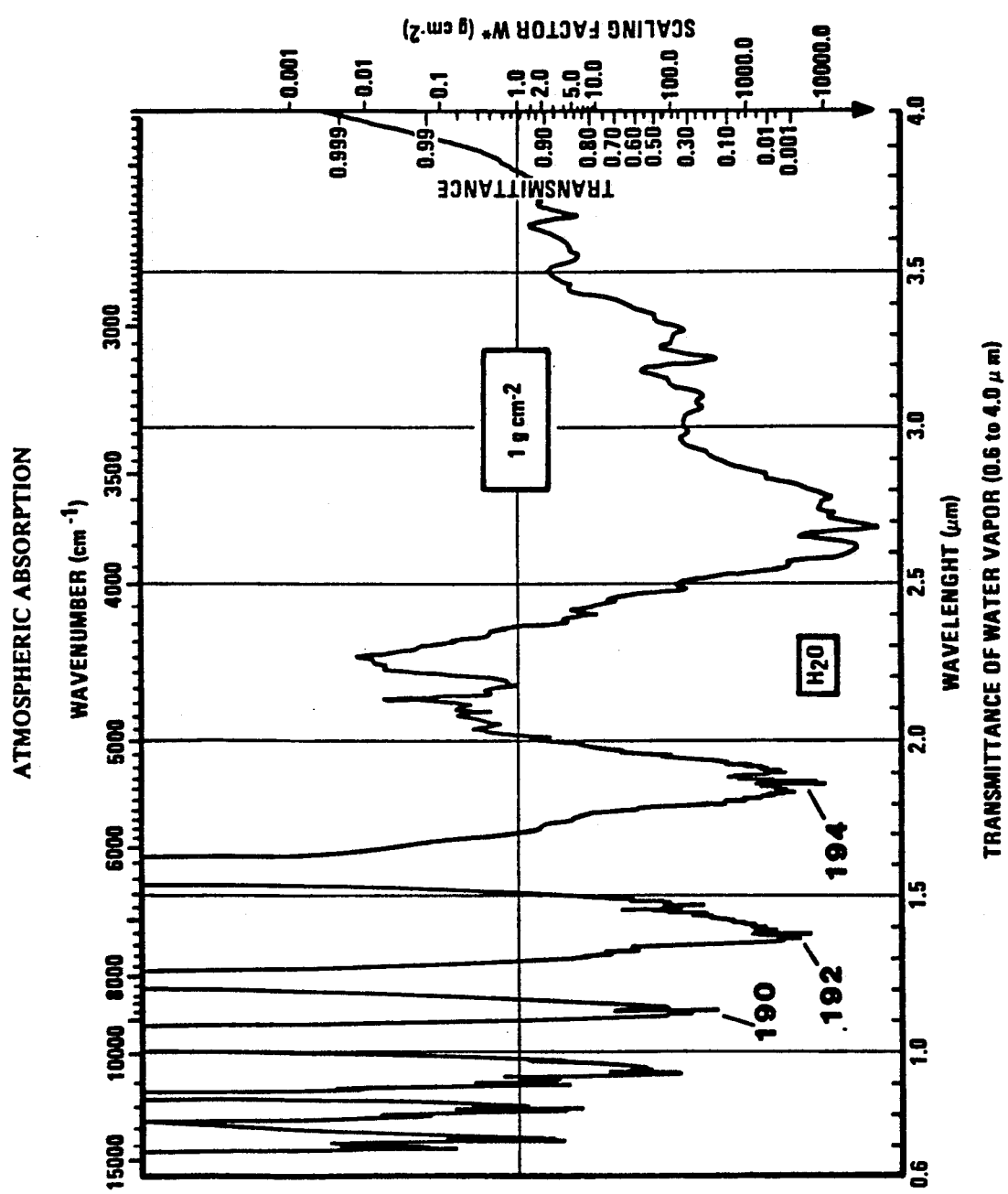
FIG. 16 graphically depicts the atmospheric absorption characteristics with respect to transmission carrier wavelength.

In accordance with one aspect of the head mounted video display system, one wavelength selected for transmitting the video signal in free space is chosen such that a predictable signal absorption occurs, notwithstanding day, night or weather conditions. This assures that the video signal will not be received beyond a maximum peripheral area surrounding the transmitter. While many parameters of the atmosphere exist which affect the absorption of a radiated wave, the water vapor content of the atmosphere has been chosen as the parameter to which absorption of a particular transmission wavelength is correlated. Reference is made to FIG. 16 where there is graphically depicted the transmittance of a radiated wave as a function of water vapor normally occurring in the atmosphere. The transmittance is represented by the vertical axis of the graph, while the wavelength of the radiated signal is shown on the horizontal axis. It can be noted from the graph of atmospheric absorption that at various fairly well defined wavelengths excessive signal attenuation occurs. For example, at a wavelength of about 1.1 um, the absorption represented by reference character 190 is at a maximum. At about 1.4 and 1.9 um the absorption of the signal is again at a maximum level.

From the graph of FIG. 16, the atmospheric transmission of a signal transmitted at a wavelength of 1.39 um is about 0.001 percent. It can be seen that by selecting a wavelength in this range, the atmospheric absorption thereof does not permit the signal to reach distant areas. As a result, it is assured that the video signal modulated on such a wavelength will not extend beyond the area of its intended reception. In the preferred form of the invention, the transmission of the video signal at a wavelength of about 1.39 um provides certain advantages over the other frequencies associated with the other maximum absorption peaks. Transmitters and receivers operating in this wavelength range are not unduly complicated and do not require the attention to additional considerations, as does the transmission or reception at the other noted wavelengths. While one could provide video transmissions at 0.9 and 1.1 um, the atmospheric attenuation is somewhat less than at 1.39 um. The absorption of the signal at a wavelength of 1.9 um is substantially identical to that associated with the 1.39 um wavelength, but additional cooling may be required for the transmitter and receiver.

The foregoing analysis can also be made to select a transmitting wavelength having desired absorbtion characteristics based on other atmospheric elements. For instance, particular wavelengths can be selected to achieve desired absorbtion characteristics in carbon dioxide or ozone.

A transmitting element 156, such as shown in FIG. 15, fabricated of either a gallium indium arsenide (GaIAs) material or a gallium arsenide antimonide material emits frequencies in the 1.39 um range when driven or excited by an electrical signal. When so driven, the transmitting element 156 will radiate a carrier frequency in the 1.39 um range and communicate the video information modulated thereon. The lens 160 in the video display receiver 126 can be constructed of glass, arsenic trisulphide sapphire, cadmium sulphide or magnesium oxide. With such materials, optical processing of the free space transmission is possible without attenuation of the signal by the lens itself. The optical to electrical transducer 159 may be constructed of a material similar to that of the transmitting element 156 and thereby convert the free space radiated video signal into a corresponding electrical signal. For optimum response to a free space transmitted wavelength of 1.39 um, the optical to electrical transducer 159 is perferably constructed of the same material as the transmitting element 156.

Figure 17:
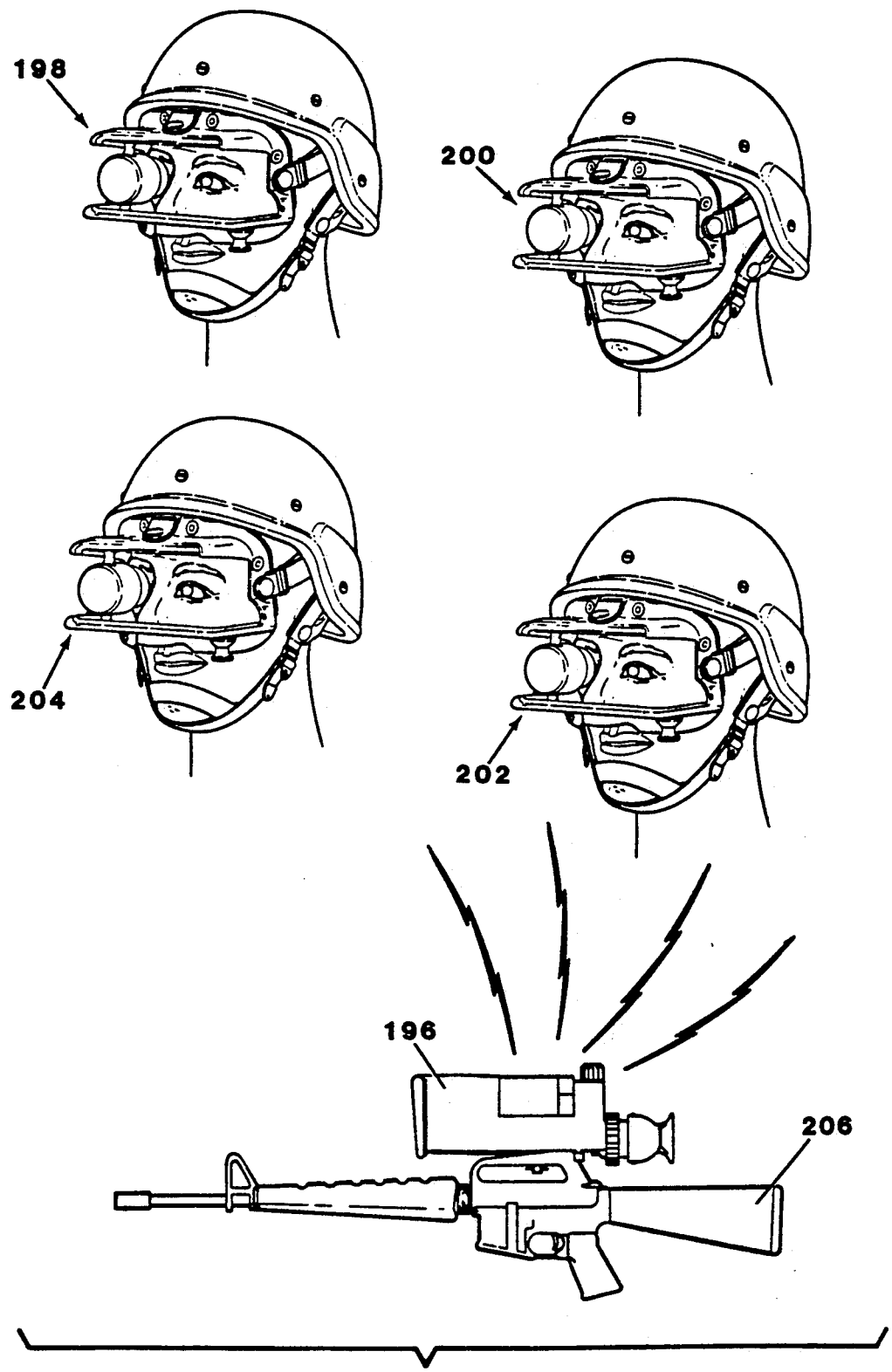
FIG. 17 shows a networking scheme used between a single video camera and a plurality of remotely located display units.
Figure 18:
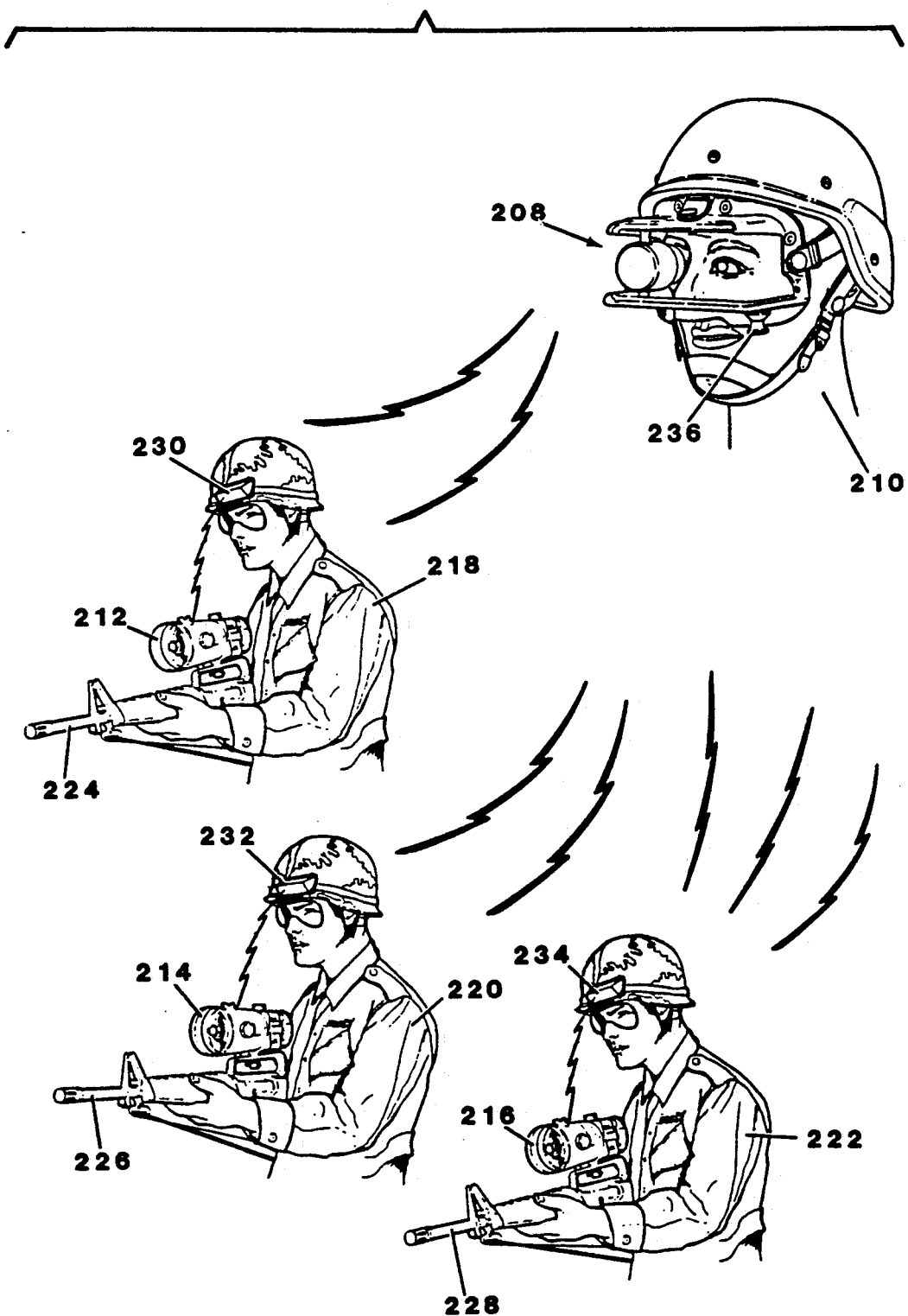
FIG. 18 shows another networking scheme used in selectively viewing one of a plurality of images generated by plural remotely located video cameras.

Shown in FIGS. 17 and 18 are additional features of the invention. The utility of the invention is enhanced when using plural remote video display receivers, even though only a single video camera is operational, or is available. FIG. 17 illustrates a single rifle-mounted video camera transmitter 196 and a plurality of helmet-mounted video display receivers 198-204. In this application, the video transmitter 196 is provided with a transmitter element (not shown) fabricated of a material which transmits the video image in free space at a desired wavelength. In a similar manner, the video display receivers 198-204 are each provided with a material which is responsive to the same wavelength radiation to thereby receive and decode the video signal as modulated by the transmitter 196. Thus, each video display receiver 198-204 is contructed to allow each of the corresponding persons wearing the helmet-mounted device to view the same object toward which the rifle 206 is aimed. This is especially advantageous in training maneuvers where plural soldiers can view a target sighted from a single weapon. Indeed, with the arrangement set forth above, military trainees need not even be disturbed from classroom instructions on weapons targeting in order to witness the actual sighting and targeting of the remotely located weapon and target.

The details of another networking technique according to the invention are shown in FIG. 18. Here, a single video display receiver 208 is helmet-mounted to a soldier 210 who can selectively receive free space transmissions of different video signals from rifle-mounted cameras 212, 214 and 216. Each soldier 218-222 carrying a respective rifle 224-228 is equipped with a helmet-mounted video display receiver 230-234 so that the particular objects captured by the respective video cameras 212-216 can be seen by the respective soldiers 218-222. The transmitting wavelength of the video equipment provided the soldier 218 will preferably be different from the wavelength used by the equipment of soldiers 220 and 222. The latter two soldiers 220 and 222 may also be using different wavelength equipment. In this situation, the transmitting and receiving elements with which each soldier 218-222 is equipped will be constructed of different materials, and thus will be nonresponsive to the transmission or reception of the other soldiers' equipment. Alternatively, the modulation frequencies of the various transmitters may be different, and the soldier can select which scene he will view by tuning a filter in his receiver.

As noted above, the video display receiver 208 is selectively responsive to the transmission of each of the video camera transmitters 212-216. Associated with video receiver 208 is a switch 236 which allows the helmet wearer 210 to selectively receive the video signal of one of ten transmitters 212-216. Conventional switches are available for switching or controlling different video channels. With this arrangement soldier 210, who may be an instructor, can judge the aiming or firing technique of each soldier trainee 218-222 without being in the immediate vicinity of each such trainee. A significant advantage is gained by using this arrangement since a military instructor 210 and a soldier trainee 218, for example, can simultaneously view the same object toward which the video camera transmitter 212 is directed.

Figure 19:
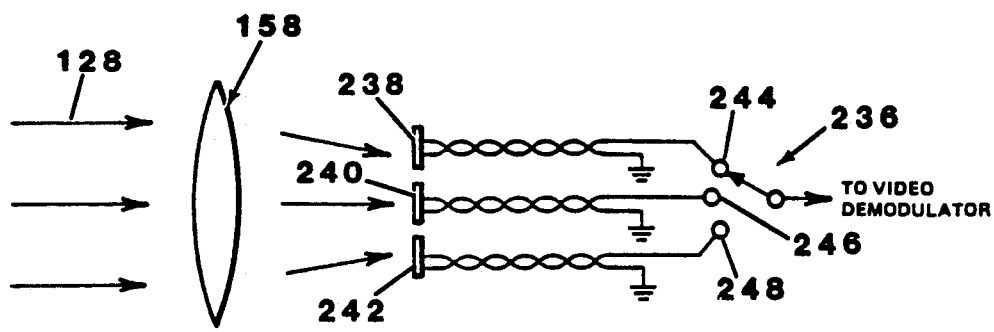
FIG. 19 illustrates a helmet-mounted switching arrangement for selective presentation of an image from one of the plural cameras shown in FIG. 18.

In FIG. 19 an exemplary switching arrangement 236 is shown, adaptable for use in the example of FIG. 18. Micrometer wavelength radiation, denoted again by reference character 128, emitted from any of the video camera transmitters 212-216 is focused by an object lens 158 onto a plurality of micrometer wavelength sensitive elements 238, 240 and 242. Each element 238-242 is responsive to a different narrow band of wavelengths which correspond to the different wavelengths transmitted by the respective video camera transmitters 212-216. In other words, element 238 is responsive to a free space wavelength transmitted only by video camera transmitter 212. Elements 240 and 242 receive only transmissions from respective camera transmitters 214 and 216. The manually operated switch 236 is switchable by the soldier 210 to position 244, 246 and 248 corresponding to the free space video camera transmitters 212-216. The single video signal selected by the soldier 210 is then switched through the manually operated switch 236 to the video demodulator 129 of FIG. 14. The switch 236 may also be ganged to a similar switch in the demodulator 129 to change an oscillator frequency such that one given video, IF (intermediate frequency) frequency is produced, notwithstanding which video transmission frequency or wavelength is selected. It is of course possible to switch or multiplex more than the number of free space transmissions shown in FIG. 18, as well as make the switchable connection within the video display receiver at points other than in the video demodulator 12.

Figure 20:
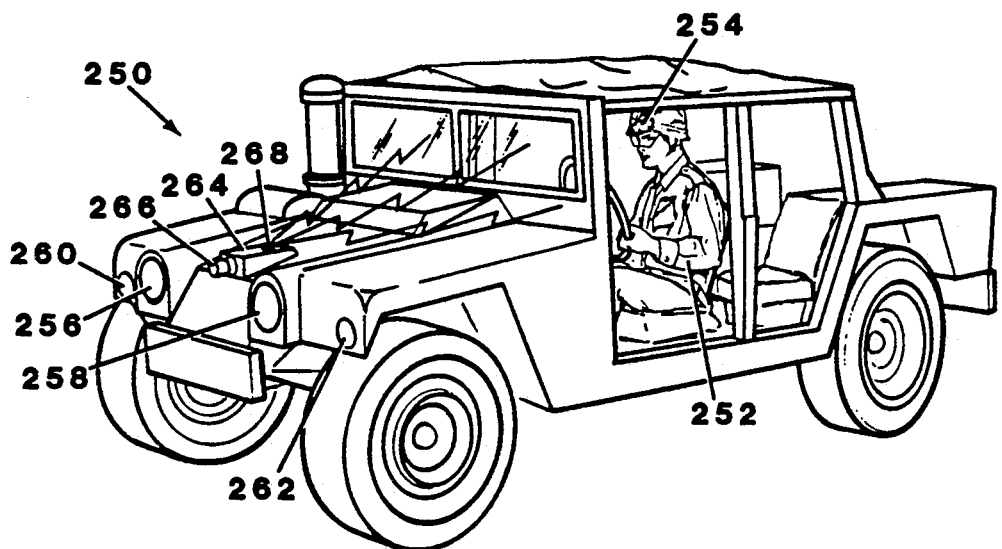
FIG. 20 illustrates a vehicle guidance system for use in connection with low probability of intercept of nocturnal activities.

In yet another application of the invention, a combination video transmitter and display receiver can be used to facilitate a low probability of detection of vehicular movement at night. FIG. 20 is illustrative of a vehicle 250 equipped with apparatus incorporating the principles and concepts of the invention. A driver 252 of the vehicle 250 is provided with a video display receiver 254 which can receive micrometer wavelength video transmissions either through free space, or through a physical medium as described above. The vehicle 250 is equipped with standard incandescent lamps 256 and 258, as well as a pair of transmitters 260 and 262 for transmitting radiation in the nonvisible light spectrum. The nonvisible light spectrum can comprise radiation wavelengths between short ultraviolet and far infrared. In this application, it is desirable to select a wavelength which is highly susceptible to atmospheric absorption. In this manner, the lamps 256 and 258 may be turned off and transmitters 260 and 262 turned on. The driver 252 can detect the light from lamps 256 and 258 with his receiver 254 while a remote observer is not able to detect the light.

Provided also is a receiver/transmitter unit 264 which has a receiver input 266 responsive to the nonvisible light reflected from objects in the path of the vehicle 250. The unit 264 further includes a transmitter 268 for transmitting free space radiation to a video display receiver 254. Characterizations of the terrain or objects in the path of the vehicle 250 are thus transmitted by transmitter 268. It should be noted that the wavelength of radiation transmitted by transmitters 260 and 262 need not be the same as that transmitted by the transmitter 268. However, the receiver element (not shown) in the input 266 of the unit 264 must be responsive to radiation wavelengths in the range emitted by transmitters 260 and 262. By using different transmission wavelengths in transmitters 260, 262 and 268, an appropriately equipped soldier 252, or other similarly equipped foot soldier, can look straight into the main transmitters 260 and 262 without saturating or otherwise affecting the quality of the image displayed on the helmet-mounted display 254.

Figure 21:
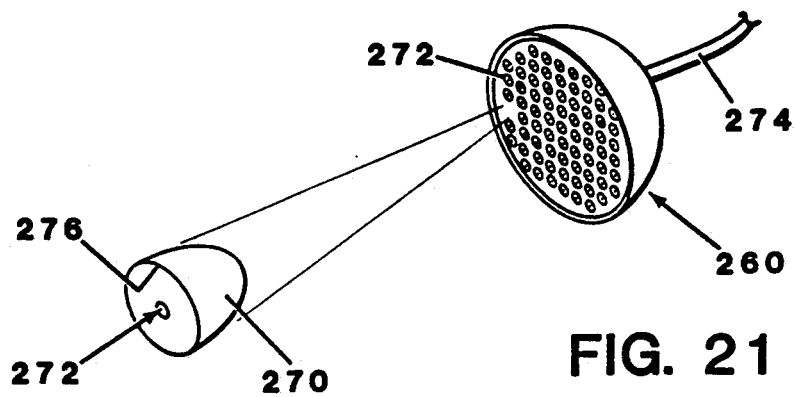
FIG. 21 illustrates a nonvisible light transmitter for use in conjunction with the system of FIG. 20.

In order to flood the path ahead of the vehicle 250 with radiation of a desired wavelength, a number of small individual transmitters can be provided in each transmitter unit 260 and 262. A vehicular micrometer wavelength transmitter is shown in exemplary form in FIG. 21. Each element (which may for example be an LED) of an array of transmitting elements 272 is mounted in a small parabolic reflector 270 (see exploded view in FIG. 21). An electrical cable 274 provides the driving energy for exciting the elements 272 so that radiation of the desired wavelength can be emitted. The reflectors 270 have reflective interior surfaces 276 so that a majority of the energy radiated from each of the elements 272 is directed in a forwardly direction in the path of the vehicle 250. Each radiating element 272 need not be driven by a separate signal, but rather all radiating elements may be driven together by a common driving electrical signal on cable 274.

From the foregoing, a video transmitter and display receiver arrangement is disclosed which provides a significant advantages when used either in military or civilian applications. The invention may find a variety of applications in the civilian environment, such as in news reporting, fire fighting or law enforcement. When used in connection with the free space transmitting features described above, the invention provides additional measures of security in that the reception of the video signal is limited to a relatively predefined area.

In a video transmitter and display receiver such as described above, many changes can be made which are not relevant to the novel features as taught by the invention. Bearing this in mind, the specific embodiments disclosed herein are intended to be merely exemplary of the invention and not restrictive thereof, since various modifications readily apparent to those familiar with the art can obviously be made without departing from the spirit and scope of the invention as claimed hereinbelow. Moreover, not all features of the invention are required to be implemented together, but rather one or more of the features may be employed with an existing system to take advantage of the individual feature.

What is claimed is:

1. A video system for use with a vehicle, comprising:
   a transmitter mounted within said vehicle for omnidirectionally transmitting a video signal of an image through free space within the vehicle; and
   a video receiver and display mountable to a person's head for receiving and displaying the image irrespective of the person's location within the vehicle.

2. The video system of claim 1 further including a flexible headgear with a frame for mounting said video receiver and said display thereto.

3. The video system of claim 1 further including a rigid helmet for mounting said video receiver and said display thereto.

4. The video system of claim 1 further including a plurality of said head mounted video receivers and displays for a corresponding plurality of persons within the vehicle.

5. The video system of claim 1 wherein said transmitter includes means for transmitting the video signal on an optical carrier having a nonvisible wavelength.

6. The video system of claim 5 wherein said transmitter includes means for transmitting a carrier having a wavelength between short ultraviolet and far infrared.

7. The video system of claim 1 further including means mounted external to the vehicle for generating said video signal and relaying the video signal to said transmitter for retransmission within the vehicle.

8. The video system of claim 7 wherein said generating means includes night vision equipment for generating video signals representative of objects disposed in the darkness.

9. The video system of claim 7 wherein said generating means includes infrared detecting equipment for generating video signals representative of the thermal radiation of objects.

* * * * *